United States Patent [19]

Gaiser et al.

[11] Patent Number: 4,527,395
[45] Date of Patent: Jul. 9, 1985

[54] MASTER CYLINDER

[75] Inventors: Robert F. Gaiser, Stevensville; Larry G. Lohraff, Berrien Springs, both of Mich.

[73] Assignee: Allied Corporation, Morristown, N.J.

[21] Appl. No.: 656,294

[22] Filed: Oct. 1, 1984

Related U.S. Application Data

[63] Continuation of Ser. No. 270,428, Jun. 4, 1981, abandoned.

[51] Int. Cl.³ .............................................. B60T 11/20
[52] U.S. Cl. ...................................... 60/562; 60/589; 92/170; 92/171
[58] Field of Search ......................... 60/562, 585, 589; 92/170, 171

[56] References Cited

U.S. PATENT DOCUMENTS

| | | | |
|---|---|---|---|
| 667,525 | 2/1901 | Huber | 72/60 |
| 2,584,518 | 2/1952 | Walten | 92/171 |
| 3,357,183 | 12/1967 | Krieger | 60/562 |
| 3,357,184 | 12/1967 | Hager | 60/562 |
| 3,416,315 | 12/1968 | Wortz | 60/562 |
| 3,490,344 | 1/1970 | Archer | 92/169 |
| 3,618,320 | 11/1971 | Ingram | 60/562 |
| 3,696,714 | 10/1972 | Panigati | 92/170 |
| 4,249,381 | 2/1981 | Gaiser | 60/562 |
| 4,329,846 | 5/1982 | Gaiser | 60/562 |
| 4,414,811 | 11/1983 | Gaiser | 60/589 |

Primary Examiner—Abraham Hershkovitz
Attorney, Agent, or Firm—Ken C. Decker

[57] ABSTRACT

A master cylinder (10) defines a housing (12) with a bore (14) receiving a first piston (32) and a second piston (34). A sleeve (50) disposed within the bore (14) cooperates with a plurality of seals (68, 70, 72) to balance the forces caused by fluid pressure acting against the inside of the sleeve (50) and the outside of the sleeve (50). The sleeve (50) is made from a lightweight plastic material.

2 Claims, 1 Drawing Figure

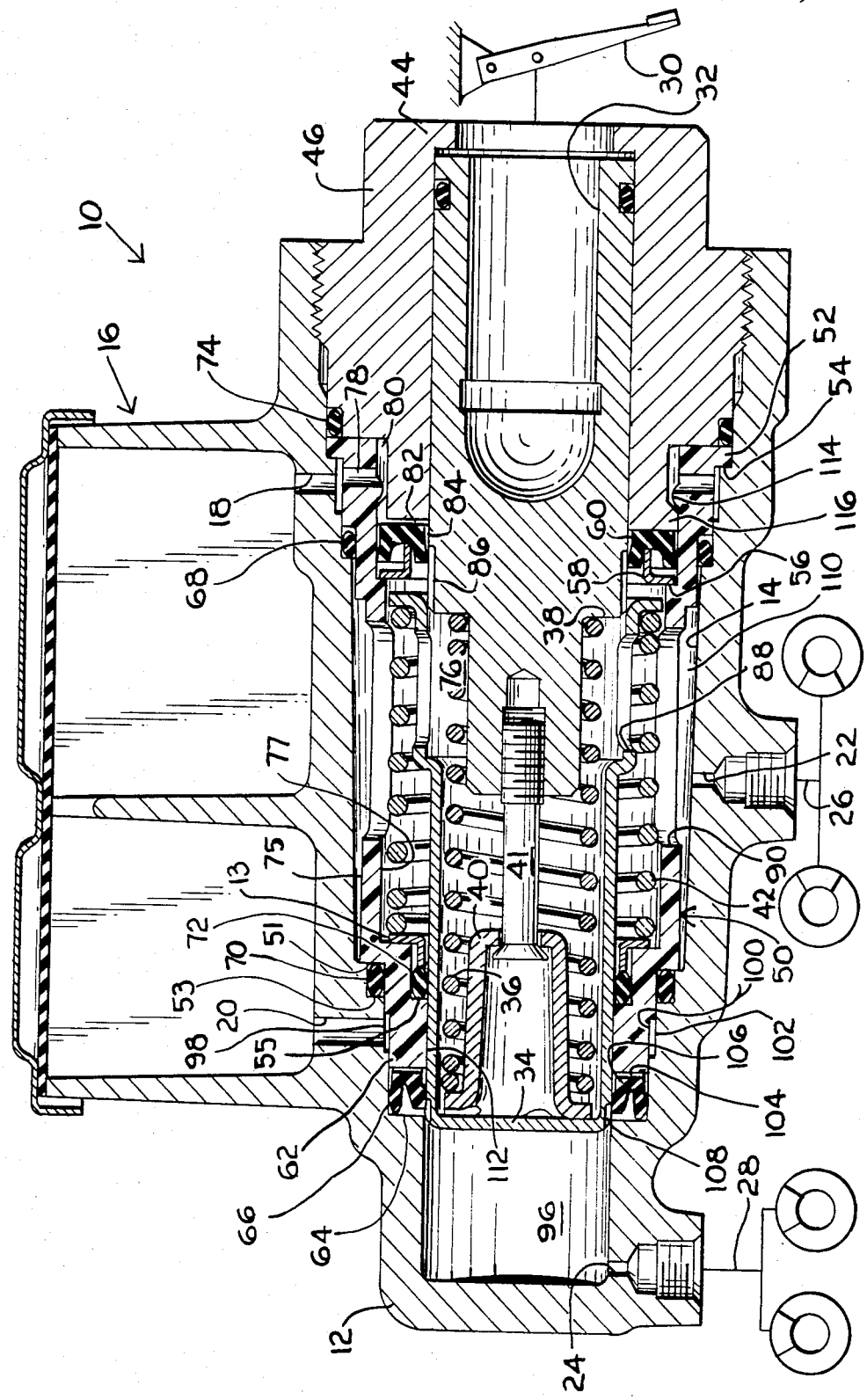

MASTER CYLINDER

This is a continuation of application Ser. No. 270,428, filed June 4, 1981, now abandoned.

A master cylinder includes a housing which receives a pair of pistons movable during braking to generate fluid pressure within the housing. In a displacement type master cylinder a pair of lip seals are fixedly disposed within the housing so that the pair of pistons move past the pair of lip seals, respectively.

The prior art is illustrated in U.S. Pat. No. 4,249,381. The master cylinder in this patent is provided with a sleeve to locate the fixed positions for the pair of lip seals. One of the lip seals is disposed between the end of the sleeve and a shoulder on the housing, while the other lip seal is deposited between a shoulder on the sleeve and a bearing extending into the sleeve.

The present invention provides a master cylinder comprising a housing (12) having an axially extending bore (14), a pair of pistons (32, 34) movably disposed within the bore (14) and cooperating with a pair of pressure chambers (76, 96), respectively, to generate fluid pressure therein in response to movement of the pair of pistons (32, 34) within the bore (14), a sleeve assembly (50) disposed within the bore (14), the sleeve assembly (50) including an inner surface (77) and an outer surface (75) exposed to fluid pressure generated in one (76) of said pair of pressure chambers, and a plurality of seals (60, 68, 70, 72) cooperating with the sleeve assembly to seal the latter within the one pressure chamber, characterized by at least one pair (70, 72 or 60, 68) of said plurality of seals engaging said sleeve assembly at substantially the same axial position so that fluid pressure acting against the inner surface adjacent said one pair of seals will be substantially offset by the fluid pressure acting against the outer surface adjacent said one pair of seals.

It is an advantage of the present invention that a lightweight plastic sleeve can be utilized with a displacement type master cylinder to permit an economical molding to be used to manufacture the plastic sleeve.

One way of carrying out the invention is illustrated below with reference to the accompanying drawing which illustrates a single embodiment.

The sole FIGURE is a side view in cross section showing a master cylinder constructed in accordance with the present invention.

In the master cylinder 10 of FIG. 1, a housing 12 defines a bore 14. A reservoir 16 is formed by the housing 12 to carry fluid therein. A pair of compensation ports 18 and 20 communicate the fluid from the reservoir 16 to the bore 14 in a manner described hereinafter. A pair of outlet ports 22 and 24 communicate, respectively, with brake circuits 26 and 28. A brake pedal 30 is connected via suitable connecting means with a first piston 32 to move the latter into the bore 14 during braking. A second piston 34 is disposed within the bore 14 to move partly via spring 36 when the first piston 32 is moved. The spring 36 extends between a shoulder 38 on the first piston 32 and a retainer 40 which engages the second piston 34 and is engageable with a stem 41 to define a rest position for the second piston 34. A retraction spring 42 abutting clip 43 biases the second piston to its rest position engaging retainer 40 and the retraction spring 42 also cooperates with spring 36 to bias the first piston 32 to its rest position abutting a flange 44 on bearing 46.

A sleeve 50 is fixedly disposed within the bore 14. The sleeve 50 includes a flange 52 at one end abutting a step 54 on the wall of the bore 14. The sleeve forms a shoulder 56 which cooperates with a ring 58 to define a fixed position for a first lip seal 60. The other end 62 of the sleeve cooperates with another step 64 on the wall of the bore 14 to define a fixed position for a second lip seal 66.

A first O-ring seal 68 sealingly engages the outer surface of sleeve 50 and the wall of bore 14 near the port 18. A second O-ring seal 70 sealingly engages the outer surface of sleeve 50 adjacent a radially outer shoulder 51 and a shoulder 53 formed by the wall of bore 14 near the port 20. A third O-ring seal 72 sealingly engages the inner surface of sleeve 50 adjacent a radially inner shoulder 55 and the outer surface of the second piston 34, and a fourth O-ring seal 74 sealingly engages the wall of bore 14 and the bearing 46 near the port 18. The first lip seal 60 cooperates with the first piston 32, the second piston 34, the sleeve 50 and the plurality of O-ring seals 68, 70 and 72 to substantially define a first pressure chamber 76. In the rest position, fluid is communicated from the reservoir 16 to the first pressure chamber by means of the port 18, an aperture 78 on the sleeve, an axial recess 80 on the bearing, a radial recess 82 on the bearing, a recess 84 on the radial inner edge of the first lip seal 60, and a slot 86 on the first piston 32. From the first chamber 76, fluid is also communicated to the outlet 22 and the brake circuit 26 via slots 88 and 90 on the second piston and sleeve, respectively. The second lip seal 66 cooperates with the second piston 34 and the wall of bore 14 to substantially define a second pressure chamber 96. Fluid from the reservoir 16 is communicated to the second pressure chamber 96 via port 20, an intermediate recess or chamber 98 formed by a step 100 on the end 62 of sleeve 50 and a step 102 on the wall of bore 14 adjacent port 20, a clearance between the end 62 of the sleeve and the wall of bore 14, radially extending slots 104 on the right side of second lip seal 66, a recess 106 on the radial inner edge of the second lip seal 66, and a slot 108 on the second piston 34. From the second chamber 96, fluid is communicated via outlet 24 to the brake circuit 28.

In accordance with the invention, the sleeve 50 is made from a plastic material, such as, "Zytel" by an injection molding process. The bore 14 defines a clearance 110 with the sleeve 50 between the O-ring seals 68 and 70. Consequently, fluid pressure generated within the first pressure chamber 76 is communicated to the outer surface 75 of the sleeve between O-ring seal 68 and 70 and also to the inner surface 77 of the sleeve between first lip seal 60 and O-ring seal 72. In order to offset the forces acting against the inner and outer surfaces of the sleeve by the fluid pressure within the first chamber 76, the O-ring seals 70 and 72 are disposed within the bore 14 at substantially the same axial position in engagement with the sleeve. In addition, the first lip seal 60 and the O-ring seal 68 are also disposed within the bore 50 at substantially the same axial position in engagement with the sleeve. As a result the forces acting against the inner and outer surfaces of the sleeve 50 by the fluid pressure generated in chamber 76 will be substantially equal and opposite to minimize radial loading of the plastic sleeve. Moreover, the plastic sleeve will remain in its molded shape to substantially eliminate deformation of the plastic sleeve during braking.

When the plastic sleeve 50 is formed, it is provided with an enlarged radial thickness at each end. The enlarged end 62 extends from the lip seal 66 to the O-ring seal 72 to form a surface 112 slidably engaging the second piston 34. The other enlarged end forming flange 52 is also provided with a projection 114 extending radially inwardly to fit within the recess 80 and oppose a shoulder 116 formed on the first piston 32. The projection 114 cooperates with the shoulder 116 to form a releasable locking device for connecting the bearing 46 to the sleeve 50.

During braking, the first piston 32 moves to the left when pedal force is applied. The first piston moves the slot 86 out of communication with the recess 84 and contracts the volume of the first chamber 76 to generate fluid pressure therein. The fluid pressure in chamber 76 communicates with outlet 22 and brake circuit 26 and also cooperates with the contraction of spring 36 to bias the second piston 34 to move to the left contracting spring 42. When the slot 108 on piston 34 is moved out of communication with the recess 106 on lip seal 66, the volume of fluid within chamber 96 is contracted to generate fluid pressure in chamber 96 and brake circuit 28. Upon termination of braking the springs 36 and 42 cooperate to return the pistons 32 and 34 to their rest positions.

In conclusion, the plastic sleeve 50 provides a weight and cost savings over the conventional metal sleeve. The plastic sleeve is made from a molding process which is believed to be economically advantageous over an extruded or stamped metal sleeve. And the plastic sleeve is pressure balanced within the master cylinder to substantially eliminate deformation of the sleeve during braking operation.

We claim:

1. A master cylinder comprising a housing having an axially extending bore, a pair of pistons movably disposed within the bore and cooperating with a pair of pressure chambers, respectively, to generate fluid pressure therein in response to movement of the pair of pistons within the bore, a sleeve assembly disposed within the bore, the sleeve assembly including an inner surface and an outer surface exposed to fluid pressure generated in one of said pair of pressure chambers, the sleeve assembly including a slot to communicate fluid pressure from the inner surface to the outer surface, and a pair of seals cooperating with the sleeve assembly to seal the latter within the one pressure chamber, characterized by said pair of seals engaging said sleeve assembly at substantially the same axial position so that fluid pressure acting against the inner surface adjacent said pair of seals will be offset by the fluid pressure acting against the outer surface adjacent said pair of seals to reduce deformation of said sleeve assembly in response to fluid pressure, said sleeve assembly having a substantially uniform thickness except for one end thereof which is provided with an enlarged thickness, forming a sliding interface with one of the pistons, said one end substantially adjoining said pair of seals, said housing bore including a wall defining a first shoulder which engages one of said pair of seals, said first shoulder aligning with a second shoulder formed by said sleeve assembly which engages the other of said pair of seals, whereby said first and second shoulders fixedly locate said pair of seals in alignment with said sleeve assembly adjacent said one end and said one end extends away from said pair of seals toward said other pressure chamber.

2. The master cylinder of claim 1 further characterized by said housing supporting a reservoir containing fluid therein and defining a port leading from said reservoir to said bore and said sleeve assembly one end including a step and cooperating with the wall of said bore to define an intermediate chamber for communicating fluid from said reservoir to said other pressure chamber.

* * * * *